(12) United States Patent
Roy et al.

(10) Patent No.: US 8,931,798 B1
(45) Date of Patent: Jan. 13, 2015

(54) FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

(71) Applicant: Faurecia Interior Systems, Inc., Auburn Hills, MI (US)

(72) Inventors: Wes Roy, Oakland, MI (US); James Steele, Macomb, MI (US); Raymond E. Kalisz, Livonia, MI (US); Scott Beam, Commerce Township, MI (US); Adrien Bender, Clawson, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/108,895

(22) Filed: Dec. 17, 2013

Related U.S. Application Data

(60) Provisional application No. 61/861,494, filed on Aug. 2, 2013.

(51) Int. Cl.
*B60R 21/20* (2011.01)
*B60R 21/215* (2011.01)

(52) U.S. Cl.
CPC .................................... *B60R 21/215* (2013.01)
USPC ..................................... 280/728.3; 280/728.2

(58) Field of Classification Search
USPC .......................... 280/728.1, 728.2, 728.3, 732
See application file for complete search history.

(56) References Cited

U.S. PATENT DOCUMENTS

| | | |
|---|---|---|
| 5,135,252 A | 8/1992 | Suran et al. |
| 5,145,207 A | 9/1992 | Bederka et al. |
| 5,303,951 A | 4/1994 | Goestenkors et al. |
| 5,342,090 A | 8/1994 | Sobczak et al. |
| 5,482,313 A | 1/1996 | Ikeya et al. |
| 5,527,063 A | 6/1996 | Garner et al. |
| 5,588,669 A | 12/1996 | Leonard et al. |

(Continued)

FOREIGN PATENT DOCUMENTS

| | | |
|---|---|---|
| DE | 102006008564 A1 | 8/2007 |
| DE | 102007007822 A1 | 9/2007 |

(Continued)

OTHER PUBLICATIONS

USPTO, Notice of Allowance and Fee(s) Due for U.S. Appl. No. 14/108,915, mailed Aug. 25, 2014.

*Primary Examiner* — Toan To
(74) *Attorney, Agent, or Firm* — Ingrassia Fisher & Lorenz, P.C.

(57) ABSTRACT

Interior panels having integrated airbag doors for motor vehicles are provided. In one example, an interior panel comprises a substrate having an opening. A skin covering and foam cover the substrate. An airbag chute-door assembly is mounted to the substrate. The airbag chute-door assembly comprises a chute wall that at least partially surrounds an interior space. The chute wall is configured to direct passage of an airbag through the interior space towards the opening. A door flap portion is pivotally connected to the chute wall via a hinge section and at least partially covers the opening. A gusset hinge feature extends from the hinge section between and operatively coupled to the door flap portion and the chute wall. A perimeter flange extends from the chute wall away from the interior space and has a flange section that overlies the outer surface of the substrate.

13 Claims, 3 Drawing Sheets

(56) References Cited

U.S. PATENT DOCUMENTS

| | | | |
|---|---|---|---|
| 5,611,564 A * | 3/1997 | Bauer | 280/728.3 |
| 5,704,635 A | 1/1998 | Tajiri et al. | |
| 5,851,023 A | 12/1998 | Nagata et al. | |
| 5,887,891 A | 3/1999 | Taquchi et al. | |
| 5,961,142 A * | 10/1999 | Shiraki et al. | 280/728.3 |
| 6,152,480 A | 11/2000 | Iwanaga | |
| 6,161,862 A | 12/2000 | Rose et al. | |
| 6,161,865 A | 12/2000 | Rose et al. | |
| 6,193,271 B1 | 2/2001 | Shimane | |
| 6,250,669 B1 | 6/2001 | Ohmiya | |
| 6,406,056 B2 | 6/2002 | Yokota | |
| 6,457,739 B1 | 10/2002 | Dailey et al. | |
| 6,457,744 B1 | 10/2002 | Tonooka | |
| 6,460,874 B1 | 10/2002 | McDonnell et al. | |
| 6,543,802 B1 | 4/2003 | Uchiyama et al. | |
| 6,557,886 B1 | 5/2003 | Sakaguchi | |
| 6,716,519 B2 | 4/2004 | Ueno et al. | |
| 6,726,239 B1 * | 4/2004 | Teranishi et al. | 280/728.3 |
| 7,063,349 B2 * | 6/2006 | Takahashi | 280/728.2 |
| 7,237,797 B2 * | 7/2007 | Dailey et al. | 280/728.3 |
| 7,434,828 B2 | 10/2008 | Okamoto et al. | |
| 7,543,845 B2 | 6/2009 | Dailey et al. | |
| 7,607,681 B2 | 10/2009 | Okada et al. | |
| 7,690,677 B2 * | 4/2010 | Cowelchuk et al. | 280/728.3 |
| 7,695,001 B2 | 4/2010 | Adler et al. | |
| 7,766,372 B2 | 8/2010 | Hillman | |
| 7,914,039 B2 * | 3/2011 | Mazzocchi et al. | 280/732 |
| 7,992,890 B2 | 8/2011 | Nogaret et al. | |
| 8,336,906 B2 * | 12/2012 | Kim et al. | 280/728.3 |
| 8,336,908 B1 | 12/2012 | Kalisz et al. | |
| 8,469,393 B1 | 6/2013 | Siewert et al. | |
| 8,474,861 B1 * | 7/2013 | Twork | 280/728.3 |
| 2001/0026063 A1 | 10/2001 | Yokota | |
| 2002/0042235 A1 | 4/2002 | Ueno et al. | |
| 2002/0063415 A1 | 5/2002 | Uchiyama et al. | |
| 2003/0189321 A1 * | 10/2003 | Takahashi | 280/728.3 |
| 2003/0234521 A1 | 12/2003 | Schenck et al. | |
| 2004/0126532 A1 * | 7/2004 | Gardner, Jr. | 428/43 |
| 2004/0145164 A1 | 7/2004 | North | |
| 2004/0174000 A1 * | 9/2004 | Speelman et al. | 280/728.3 |
| 2005/0167958 A1 | 8/2005 | Okada et al. | |
| 2005/0225062 A1 * | 10/2005 | Dumbrique | 280/728.3 |
| 2006/0214339 A1 | 9/2006 | Miyake | |
| 2007/0045995 A1 | 3/2007 | Adler et al. | |
| 2007/0205585 A1 | 9/2007 | Okada et al. | |
| 2008/0018081 A1 | 1/2008 | Yang et al. | |
| 2008/0128943 A1 | 6/2008 | Hager | |
| 2009/0309338 A1 | 12/2009 | Hillman | |
| 2010/0230938 A1 | 9/2010 | Mazzocchi et al. | |
| 2010/0230939 A1 | 9/2010 | Mazzocchi et al. | |
| 2011/0062685 A1 | 3/2011 | Kim et al. | |
| 2011/0248482 A1 | 10/2011 | Kim | |
| 2012/0007346 A1 | 1/2012 | Morawietz et al. | |
| 2012/0217729 A1 | 8/2012 | Horibe et al. | |

FOREIGN PATENT DOCUMENTS

| | | |
|---|---|---|
| DE | 102008011697 A1 | 9/2009 |
| DE | 102008021157 A1 | 10/2009 |
| DE | 102009024193 A1 | 5/2010 |
| DE | 102011001981 A1 | 5/2012 |
| DE | 102012212985 A1 | 2/2013 |
| JP | H0330641 U | 3/1991 |
| JP | H11151728 A | 6/1999 |
| JP | H11321513 A | 11/1999 |
| JP | 2004243594 A | 9/2004 |
| JP | 2005008057 A | 1/2005 |
| JP | 2007145211 A | 6/2007 |
| JP | 2008126972 A | 6/2008 |
| JP | 2008149810 A | 7/2008 |
| WO | 02055346 A1 | 7/2002 |
| WO | 2005023589 A2 | 3/2005 |

* cited by examiner

FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

CROSS-REFERENCE TO RELATED APPLICATIONS

This application is related to and claims all available benefit of U.S. Provisional Patent Application 61/861,494 filed Aug. 2, 2013, the entire contents of which are herein incorporated by reference.

FIELD OF THE INVENTION

The technical field relates generally to interior panels structured for inflatable restraints for motor vehicles, and more particularly to foam-in-place interior panels having integrated airbag doors including substrates with airbag chute-door assemblies for motor vehicles.

BACKGROUND

Motor vehicles often include an inflatable restraint apparatus having an airbag device with a deployable airbag positioned in or behind an interior vehicle panel, such as an instrument panel, door panel, seats, and the like. Many interior panels include an integrated airbag door formed into the interior panel that is designed to break free upon deployment of the airbag. Often an area of the interior panel surrounding the integrated airbag door is scored or pre-weakened to form a seam that facilitates a clean airbag deployment e.g., airbag deployment with minimal or no fragmentation.

Foam-in-place (FIP) interior panels are often used to provide a padded finish to desired areas of the interiors of motor vehicles. FIP interior panels include a substrate and a skin covering with a foam layer formed between the skin covering and the substrate to provide padding for a softer finish. During fabrication, the foam layer is typically formed by injecting a foam forming material(s) between the substrate and the skin covering. In FIP interior panels that include an airbag device, an opening is typically defined in the substrate to accommodate the airbag device.

In one example, disclosed in U.S. Pat. No. 7,237,797 issued to Dailey et al., a modular airbag door assembly that includes a door panel and a separate airbag chute that are assembled together and mounted to a substrate of a FIP instrument panel. The modular airbag door assembly is positioned on a front side of the substrate with the door panel extending over an opening formed through the substrate and the airbag chute extending through the opening to the back side of the substrate. A pre-weakened skin covering with an underlying foam layer is then formed over the front side of the substrate so that the modular airbag door assembly is integrated into the FIP instrument panel hidden behind the pre-weakened skin covering and the foam layer. An airbag device is then mounted to both the chute portion and the substrate adjacent to the back side of the substrate. Unfortunately, this arrangement is relatively complex using multiple parts including a door panel and a separate airbag chute during assembly. Additionally, deploying the airbag can sometimes result in the door panel opening uneven through the pre-weakened skin covering and the foam layer which can affect, for example, unfolding of the airbag outside of the FIP instrument panel and/or whether the airbag deployment is clean with minimal or no fragmentation. Further improvements in controlling the opening of the door panel and the deployment of the airbag are needed.

Accordingly, it is desirable to provide FIP interior panels having integrated airbag doors with improvements for assembling including reducing the complexity and the number of corresponding parts. Additionally, it is desirable to provide FIP interior panels having integrated airbag doors with improved control during airbag deployment. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles are provided herein. In accordance with an exemplary embodiment, an interior panel having an integrated airbag door for a motor vehicle includes, but is not limited to, a substrate having an outer surface, an inner surface, and an opening extending therethrough. A skin covering extends over the substrate. A foam is disposed between the skin covering and the substrate. An airbag chute-door assembly is mounted to the substrate and has a front side that faces towards the skin covering and the foam and a back side that is disposed opposite the front side. The airbag chute-door assembly comprises a chute wall that extends from the back side away from the skin covering and the foam and at least partially surrounds an interior space. The chute wall is configured to direct passage of an airbag through the interior space towards the opening during deployment. A door flap portion is pivotally connected to the chute wall via a hinge section and at least partially covers the opening. A gusset hinge feature extends from the hinge section between and operatively coupled to the door flap portion and the chute wall. A perimeter flange extends from the chute wall away from the interior space and has a flange section that overlies the outer surface of the substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to FIP interior panels having integrated airbag doors for motor vehicles. The exemplary embodiments taught herein provide an interior panel having an integrated airbag door for a motor vehicle. The interior panel comprises a substrate that has an outer surface, an inner surface, and an opening extending therethrough. A skin covering extends over the substrate and a foam is disposed between the skin covering and the substrate.

An airbag chute-door assembly is mounted to the substrate and has a front side that faces towards the skin covering and the foam and a back side that is disposed opposite the front side. The airbag chute-door assembly comprises a chute wall that extends from the back side away from the skin covering and the foam and at least partially surrounds an interior space. The chute wall is configured to direct passage of an airbag through the interior space towards the opening during deployment of the airbag. A door flap portion is pivotally connected to the chute wall via a hinge section and at least partially covers the opening. A perimeter flange extends from the chute wall away from the interior space and has a flange section that overlies the outer surface of the substrate. In an exemplary embodiment, advantageously, the airbag chute-door assembly is formed as a single integrated part, for example, via an injection molding process to minimize the number of parts and reduce complexity.

One or more gusset hinge features extend from the hinge section between and operatively coupled to the door flap portion and the chute wall. In an exemplary embodiment, the airbag chute-door assembly has a groove formed in the front side between the door flap portion and the perimeter flange defining a frangible (e.g., fragile or breakable) tear seam. The frangible tear seam ruptures or tears during airbag deployment to allow the door flap portion to pivot about the hinge section. In an exemplary embodiment, advantageously, it has been found that the one or more gusset hinge features help limit or stop tearing proximate the ends of the frangible tear seams and/or the ends of the hinge section during airbag deployment and further, strengthen the hinge section so that the hinge section remains substantially fully intact and functional to allow the door flap portion to open in a substantially even or controlled manner for passage of the airbag through the opening of the substrate.

Figure 1:
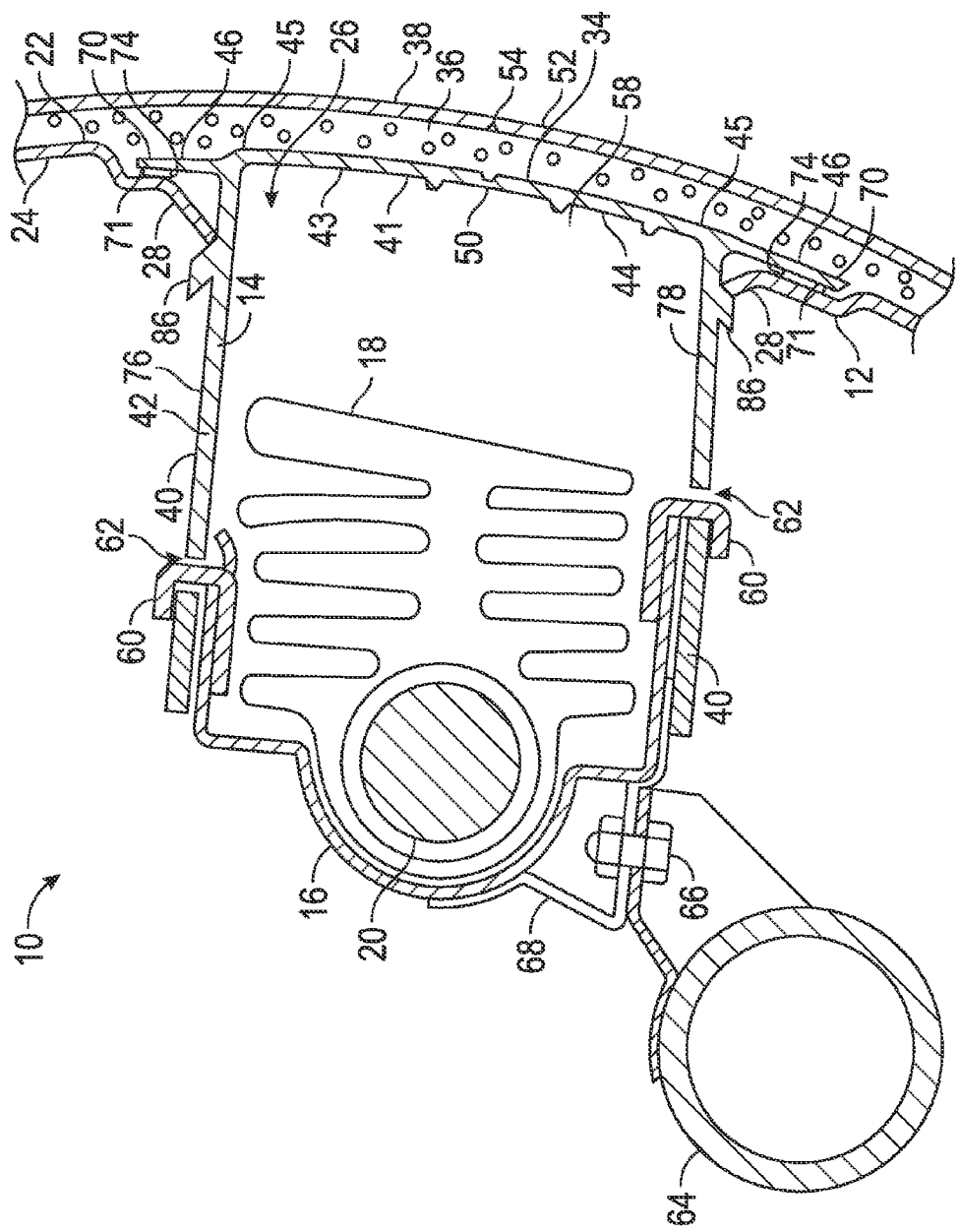
FIG. 1 is a sectional view of an airbag chute-door assembly in accordance with an exemplary embodiment.

FIG. 1 is a vertical sectional view of an interior panel 10 including a substrate 12 and an airbag chute-door assembly 14 for a motor vehicle in accordance with an exemplary embodiment. In an exemplary embodiment, the interior panel 10 is an instrument panel that can be positioned forward of a driver seat and a front passenger seat in an interior of the motor vehicle. As such, FIG. 1 depicts a view of the interior panel 10 forward of the front passenger seat. Alternatively, the interior panel 10 can be a door panel or other interior vehicle trim panel. As illustrated, the interior panel 10 comprises the substrate 12, the airbag chute-door assembly 14, and an airbag module 16 that contains a deployable airbag 18 and an inflator 20.

The substrate 12 has an outer surface 22 that faces towards the interior of the motor vehicle, an inner surface 24 that faces away from the interior of the motor vehicle, and an opening 26 that is formed through the substrate 12. As illustrated, the opening 26 is defined by inner perimeter edges 28 of the substrate 12 and is covered by the airbag chute-door assembly 14 that is mounted to the substrate 12. The substrate 12 may be formed of a plastic material, such as, for example, styrene maleic anhydride (SMA), polycarbonate (PC), ABS, PC/ABS, polypropylene (PP), or any other substrate material for vehicle interior applications known to those skilled in the art. The airbag chute-door assembly 14 may be formed of a polymeric material, such as TPE, TPO, or the like, for example as a single injection molded piece. The outer surface 22 of the substrate 12 and a front side 34 of the airbag chute-door assembly 14 are covered by foam 36 and a skin covering 38 to define the interior panel 10 as an FIP interior panel.

The airbag chute-door assembly 14 comprises a chute wall 40 that defines a chute portion 42 extending from a back side 41 of the airbag chute-door assembly 14, door flap portions 43 and 44 that are pivotally connected to the chute portion 42 via corresponding hinge sections 45, and a perimeter flange 46 that surrounds the chute portion 42. As illustrated, the door flap portions 43 and 44 are coupled together by a frangible tear seam 50 to form an "H-pattern" door arrangement. Alternative door arrangements known to those skilled in the art may also be used, such as, for example a "U-pattern" door arrangement with only a single door flap portion. The door flap portions 43 and 44 and the overlying foam 36 and skin covering 38 together define an integrated airbag door 52 that opens in a parting manner along the frangible tear seam 50 to permit the airbag 18 to unfold and inflate outside of the interior panel 10. To facilitate the opening of the integrated airbag door 52, the skin covering 38 may be pre-weakened to define a seam 54 that tears during airbag deployment.

The chute wall 40 at least partially surrounds an interior space 58. The interior space 58 is sized to permit passage of the airbag 18 towards the door flap portions 43 and 44 and the integrated airbag door 52 during airbag deployment. Attached to the chute wall 40 is the airbag module 16 that accommodates the airbag 18 in the folded state. In an exemplary embodiment, the airbag module 16 has a plurality of hooks 60 that project outwardly through chute wall openings 62 to engage the chute wall 40. The airbag module 16 is attached to a cross member 64 by a bolt and nut 66 via a supporting member 68. As illustrated, the inner perimeter edges 28 of the substrate engage locking tabs 85 on the chute wall 40 for fixedly mounting the airbag chute-door assembly 14 to the substrate 12.

The perimeter flange 46 extends from the chute wall 40 away from the interior space 58 and has a flange section 70. The flange section 70 overlies the outer surface 22 of the substrate 12. In an exemplary embodiment, a foam gasket 71 is disposed between the flange section 70 and the outer surface 22 of the substrate to form a seal 74 substantially or completely around the opening 26. During an early fabrication stage for forming the foam 36, advantageously the seal 74 substantially prevents leakage of a liquid foam forming material into the interior space 58.

Figure 2:
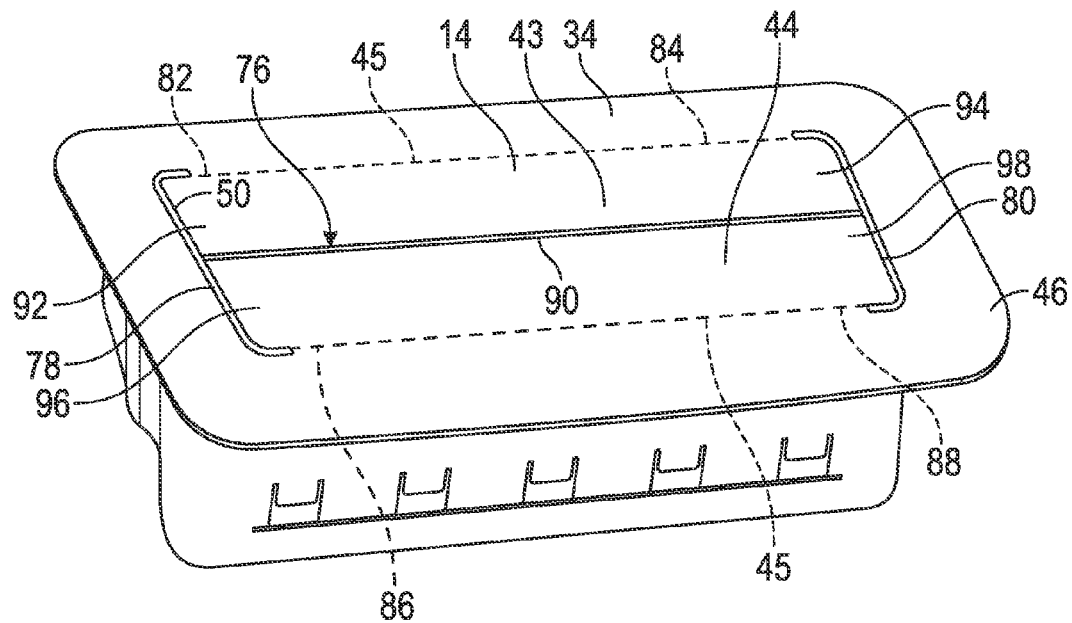
FIG. 2 is a perspective view of an airbag chute-door assembly in accordance with an exemplary embodiment.
Figure 3:
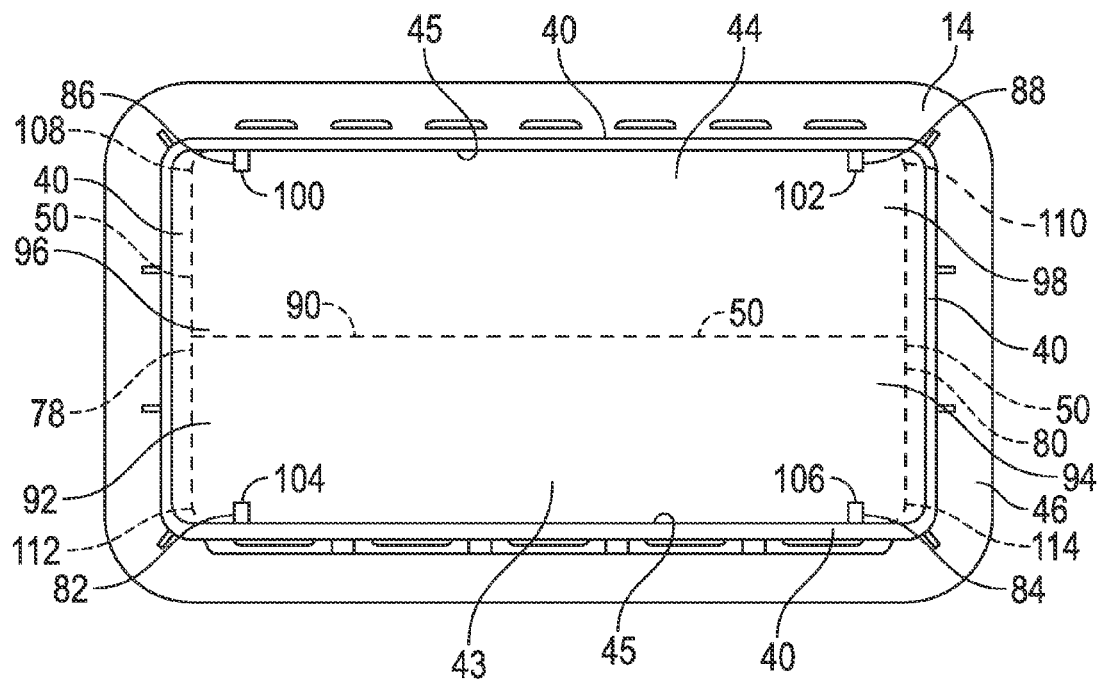
FIG. 3 is a rearview of an airbag chute-door assembly in accordance with an exemplary embodiment.

FIGS. 2 and 3 are a perspective front-side view and a rearview of the airbag chute-door assembly 14, respectively, in accordance with an exemplary embodiment. As illustrated, the airbag chute-door assembly 14 has a groove 76 that is formed in the front side 34 of the airbag chute-door assembly 14 defining the frangible tear seam 50. In an exemplary embodiment, the groove 76 is configured such that the frangible tear seam 50 has lateral tear seam sections 78 and 80 that each extends from an opposing end 82 or 84 of the hinge section 45 to a corresponding opposing end 86 or 88 of the other hinge section 45, and a transverse tear seam section 90 that extends between the lateral tear seam sections 78 and 80 to define an "H-pattern" airbag door arrangement. As illustrated, the lateral tear seam sections 78 and 80 are defined by portions of the groove 76 that are disposed between the perimeter flange 46 and the lateral sides 92, 94, 96, and 98 of the door flap portions 43 and 44.

As illustrated in FIG. 3, gusset hinge features 100, 102, 104, and 106 correspondingly extend from the hinge sections 45 between and operatively coupled to the door flap portions 43 and 44 and the chute wall 40. In an exemplary embodiment, the gusset hinge features 100 and 102 are spaced apart and correspondingly disposed proximate the opposing ends 86 and 88 of the hinge section 45 and the ends 108 and 110 of the lateral tear seam sections 78 and 80, respectively. Likewise, the gusset hinge features 104 and 106 are spaced apart and correspondingly disposed proximate the opposing ends 82 and 84 of the other hinge section 45 and the ends 112 and 114 of the lateral tear seam sections 78 and 80, respectively. It has been found that during airbag deployment when the frangible tear seam 50 ruptures and tears along the lateral tear seam sections 78 and 80, the gusset hinge features 100, 102, 104, and 106 help to stop or limit tearing beyond the ends 108, 110, 112, and 114 of the lateral tear seam sections 78 and 80 that might otherwise occur and continue into portions of the hinge sections 45. As such, this arrangement of the gusset hinge features 102, 104, 106, and 108 advantageously helps keep the hinge sections 45 substantially fully intact and functional during airbag deployment to allow the door flap portions 43 and 44 to open in a substantially even or controlled manner.

Figure 4:
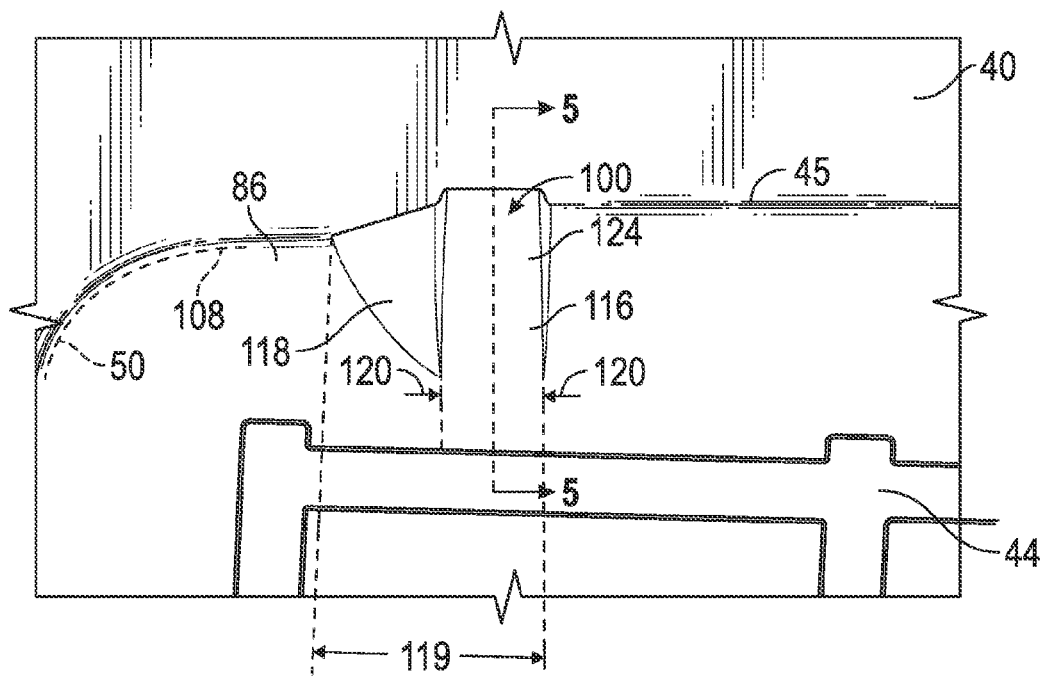
FIG. 4 is an enlarged view of a gusset hinge feature depicted in FIG. 3.
Figure 5:
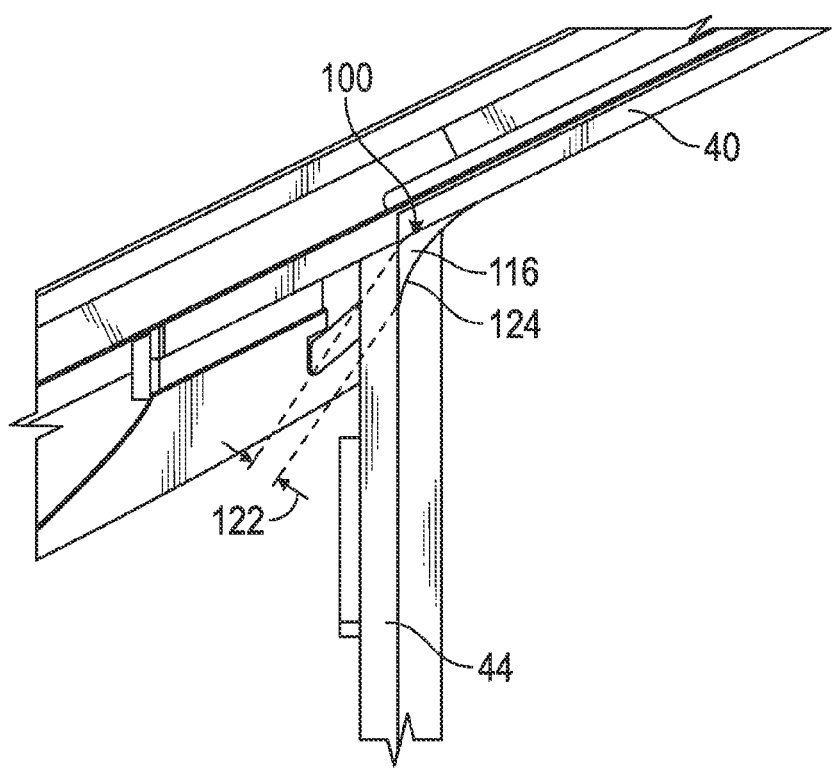
FIG. 5 is a sectional view taken along line 5-5 of the gusset hinge feature depicted in FIG. 4.

Referring to FIGS. 3-5, in an exemplary embodiment, each of the gusset hinge features 100, 102, 104, and 106 have a gusset rib portion 116 and a fill portion 118 that extends from the gusset rib portion 116 towards the corresponding end 108, 110, 112, or 114 of the frangible tear seam 50. As illustrated, the fill portion 118 tapers in a direction from the gusset rib portion 116 towards the corresponding end 108, 110, 112, or 114 of the frangible tear seam 50. Advantageously, the fill portion 118, which is preferably tapered, helps slow further tearing (e.g., decreasing the tear rate) that might occur beyond the corresponding end 108, 110, 112, or 114 of the frangible tear seam 50 and further, the gusset rib portion 116 helps stop or limit progression of any tearing into the corresponding hinge section 45. In an exemplary embodiment, each of the gusset hinge features 100, 102, 104, and 106 has a maximum width (indicated by double headed arrow 119) of from about 5 to about 20 mm and the gusset rib portion 116 has a maximum width (indicated by arrows 120) of from about 3 to about 10 mm to advantageously help stop or limit tearing into the corresponding hinge section 45. In an exemplary embodiment, each of the gusset hinge features 100, 102, 104, and 106 has a thickness (indicated by arrows 122) of from about 3 to about 8 mm to advantageously help stop or limit tearing into the corresponding hinge section 45. In an exemplary embodiment, the gusset rib portion 116 has a splined outer surface 124 that curves inwardly towards the hinge section 45 (shown in side view in FIG. 5) to facilitate opening of the corresponding door flap portion 43 and 44 during airbag deployment. In one example, the splined outer surface 124 is defined by a radius of from about 5 to about 25 mm.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
   a substrate having an outer surface, an inner surface, and an opening extending therethrough;
   a skin covering extending over the substrate;
   a foam disposed between the skin covering and the substrate; and
   an airbag chute-door assembly mounted to the substrate and having a front side that faces towards the skin covering and the foam and a back side that is disposed opposite the front side, wherein the airbag chute-door assembly comprises:
      a chute wall extending from the back side away from the skin covering and the foam and at least partially surrounding an interior space, and wherein the chute wall is configured to direct passage of an airbag through the interior space towards the opening during deployment;
      a door flap portion pivotally connected to the chute wall via a hinge section and at least partially covering the opening;
      a gusset hinge feature extending from the hinge section between and operatively coupled to the door flap portion and the chute wall; and
      a perimeter flange extending from the chute wall away from the interior space and having a flange section that overlies the outer surface of the substrate.

2. The interior panel of claim 1, wherein the airbag chute-door assembly comprises a first additional gusset hinge feature extending from the hinge section between and operatively coupled to the door flap portion and the chute wall.

3. The interior panel of claim 2, wherein the gusset hinge feature and the first additional gusset hinge feature are spaced apart and correspondingly disposed proximate opposing ends of the hinge section.

4. The interior panel of claim 1, wherein the airbag chute-door assembly has a frangible tear seam that ruptures during deployment of the airbag to allow the door flap portion to pivot about the hinge section, and wherein the gusset hinge feature is disposed proximate an end of the frangible tear seam.

5. The interior panel of claim 4, wherein the frangible tear seam has a first lateral tear seam section and a second lateral tear seam section that are correspondingly disposed adjacent to opposing ends of the hinge section, and a transverse tear seam section that extends between the first and second lateral tear seam sections spaced apart from the hinge section, and wherein the airbag chute-door assembly further comprises:
   an additional door flap portion that is pivotally connected to the chute wall via an additional hinge section and at least partially covers the opening, wherein the transverse tear seam section is disposed between the door flap portion and the additional door flap portion spaced apart from the additional hinge section, and wherein the first and second lateral tear seam sections correspondingly extend adjacent to lateral sides of the door flap portion and the additional door flap portion to define an "H-pattern" airbag door arrangement; and
   a second additional gusset hinge feature extending from the additional hinge section between and operatively coupled to the additional door flap portion and the chute wall.

6. The interior panel of claim 5, wherein the end of the frangible tear seam corresponds to a first end of the first lateral tear seam section, and wherein the second additional gusset hinge feature is disposed proximate a second end of the first lateral tear seam section.

7. The interior panel of claim 4, wherein the gusset hinge feature has a gusset rib portion and a fill portion that extends from the gusset rib portion towards the end of the frangible tear seam.

8. The interior panel of claim 7, wherein the fill portion tapers in a direction from the gusset rib portion towards the end of the frangible tear seam.

9. The interior panel of claim 7, wherein the gusset rib portion has a maximum width of from about 3 to about 10 mm.

10. The interior panel of claim 7, wherein the gusset rib portion has a splined outer surface that curves inwardly towards the hinge section.

11. The interior panel of claim 10, wherein the splined outer surface is defined by a radius of from about 5 to about 25 mm.

12. The interior panel of claim 1, wherein the gusset hinge feature has a maximum width of from about 5 to about 20 mm.

13. The interior panel of claim 1, wherein the gusset hinge feature has a thickness of from about 3 to about 8 mm.

\* \* \* \* \*